(12) United States Patent
Peng et al.

(10) Patent No.: US 7,063,439 B2
(45) Date of Patent: Jun. 20, 2006

(54) BACKLIGHT MODULE

(75) Inventors: Chung Peng, Taichung (TW); Chih-Kang Wu, Taoyuan (TW)

(73) Assignee: Au Optronics Corp., Hsinchu (TW)

( * ) Notice: Subject to any disclaimer, the term of this patent is extended or adjusted under 35 U.S.C. 154(b) by 176 days.

(21) Appl. No.: 10/771,400

(22) Filed: Feb. 5, 2004

(65) Prior Publication Data

US 2005/0094389 A1 May 5, 2005

(30) Foreign Application Priority Data

Oct. 30, 2003 (TW) .............................. 92130361 A

(51) Int. Cl.
*F21V 7/20* (2006.01)
(52) U.S. Cl. ...................... 362/218; 362/294; 362/216; 362/260
(58) Field of Classification Search ................ 362/216, 362/218, 225, 294, 373, 249, 260; 349/58, 349/60
See application file for complete search history.

(56) References Cited

U.S. PATENT DOCUMENTS

| | | | | |
|---|---|---|---|---|
| 2,589,744 A | * | 3/1952 | Sterling | 362/225 |
| 3,197,629 A | * | 7/1965 | Williams et al. | 362/216 |
| 3,712,981 A | * | 1/1973 | Eargle | 362/216 |
| 3,965,345 A | * | 6/1976 | Fordsmand | 362/218 |
| 4,748,546 A | * | 5/1988 | Ukrainsky | 362/223 |
| 5,398,170 A | * | 3/1995 | Lee | 362/559 |
| 5,886,758 A | * | 3/1999 | Ibaraki | 349/58 |
| 6,088,501 A | * | 7/2000 | Delrosso | 385/134 |
| 6,722,773 B1 | * | 4/2004 | Tsai et al. | 362/216 |
| 6,796,678 B1 | * | 9/2004 | Moon | 362/225 |
| 2005/0243548 A1 | * | 11/2005 | Yamashita et al. | 362/225 |

* cited by examiner

*Primary Examiner*—Stephen Husar
*Assistant Examiner*—Gunyoung T. Lee
(74) *Attorney, Agent, or Firm*—Rabin & Berdo, PC

(57) ABSTRACT

A backlight module which includes at least a U-shaped fluorescent tube, a first and a second heat-dissipating structure is provided. The U-shaped fluorescent tube includes a curved tube portion, two straight-tube luminous portions and two electrode portions. Of which, each of the two straight luminous sections has one end connected to one or the other end of the curved tube portion while the two electrode portions are correspondingly disposed at the other end of the two straight-tube luminous portions which are of equal length, parallel to each other and situated at the same side of the curved tube portion. The first heat-dissipating structure which envelops the entire or partial of curved tube portion is thermal-conductively connected to the curved tube portion. The second heat-dissipating structure which envelops one of the two electrode portions is thermal-conductively connected to the enveloped electrode portion.

20 Claims, 6 Drawing Sheets

BACKLIGHT MODULE

This application claims the benefit of Taiwan application Serial No. 92130361, filed Oct. 30, 2003.

BACKGROUND OF THE INVENTION

1. Field of the Invention

The invention relates in general to a backlight module and more particularly to a backlight module with heat-radiating design.

2. Description of the Related Art

Along with the rapid advance in the manufacturing technology of liquid crystal display (LCD) and its advantageous features of compactness, energy saving and low radiation, LCD has now been widely applied in various electronic products such as personal digital assistant (PDA), notebook computer, digital still camera, mobile phone, computer monitor screen and liquid crystal TV. Further due to the gorgeous input in R&D and the adoption of large scale production facilities, LCD is experiencing a continual quality improvement and price reduction. Consequently, the application of LCD is getting more and more popular. Since LCD panel is not self-luminous, the LCD still needs to have a backlight module to provide necessary light for display purpose.

Referring to FIG. 1A, a partial top view of a conventional backlight module, and FIG. 1B, a front view of the backlight module illustrated in FIG. 1A, at the same time. In FIG. 1A and FIG. 1B, backlight module 10 at least includes a bezel 12, a reflector sheet 14 and plural straight type cold cathode fluorescent lamps (CCFLs) 16. Bezel 12 includes a body portion 12a, a first supporting portion 12b, and a second supporting portion 12c. Of which, body portion 12a has a body portion's top face 12d. First supporting portion 12b and second supporting portions 12c are disposed at the two ends of body portion's top face 12d. The top end of first supporting portion 12b has plural slots 17b while the top end of second supporting portion 12c has plural slots 17c. Reflector sheet 14 is disposed on body portion's top face 12d but is located between first supporting portion 12b and second supporting portion 12c. It is noteworthy that other reflecting materials can also be disposed on the inner surface of the first and the second supporting portions 12b and 12c which are connected with body portion's top face 12d. Each of CCFLs 16 includes a luminous section 16a and two electrode portions 16b and 16c, wherein luminous section 16a connects electrode portions 16b and 16c. Each electrode portion 16b at each of CCFLs 16 is disposed at slot 17b of first supporting portion 12b, while each electrode portion 16c at each of CCFLs 16 is disposed at slot 17c of second supporting portion 12c. CCFLs 16 are disposed on bezel 12 with reflector sheet 14 disposed underneath.

When a high voltage is applied onto electrode portions 16b and 16c, electrons are ejected toward luminous section 16a from electrode portions 16b and 16c to collide with the mercury inside luminous section 16a. Following the collision triggered by high-voltage accelerated electrons, mercury will return to a stable status from an unstable status in an instant and will release extra energy in the form of 253.7 nm ultraviolet light. When absorbed by the fluorescent powder on the inner wall of luminous section 16a, the ultraviolet light will be transformed into visible light and emitted outside CCFLs 16.

It is noteworthy that when CCFLs 16 are emitting the light, heat will be generated inside the tubes which will boost the temperatures at the tube wall up. Since mercury concentrates better at low temperatures, it becomes more and more difficult for mercury to concentrate at luminous section 16a as the temperatures at the tube wall are getting higher and higher. Consequently, the mercury at CCFLs 16 will diffuse towards electrodes 16b and 16c and will be deposited there due to sputter effect. This severely affects the electricity quality of electrode portions 16b and 16c, resulting in a shorter lifetime of CCFL 16 and a poorer luminance quality of backlight module 10.

SUMMARY OF THE INVENTION

It is therefore an object of the invention to provide a backlight module whose heat-radiating design of installing a heat-dissipating structure in the fluorescent tube or using a heat-dissipating fluid to ventilate the fluorescent tube can effectively reduce the deposit of mercury at the electrode portion of the fluorescent tube due to sputter effect, hence prolonging the lifetime of the fluorescent tube and improving the luminance quality of the backlight module.

It is therefore an object of the invention to provide a backlight module which includes at least a U-shaped fluorescent tube, a first and a second heat-dissipating structure. The U-shaped fluorescent tube includes a curved tube portion, two straight-tube luminous portions and two electrode portions. Of which, each of the two straight luminous sections has one end connected to one or the other end of the curved tube portion while the two electrode portions are correspondingly disposed at the other end of the two straight-tube luminous portions which are of equal length, parallel to each other and situated at the same side of the curved tube portion. The first heat-dissipating structure which envelops the entire or partial of curved tube portion is thermal-conductively connected to the curved tube portion. The second heat-dissipating structure which envelops one of the two electrode portions is thermal-conductively connected to the enveloped electrode portion.

It is therefore another object of the invention to provide a backlight module which includes at least a bezel, a U-shaped fluorescent tube, two first heat-dissipating structures and two second heat-dissipating structures. The bezel includes a body portion, a first supporting portion and a second supporting portion, wherein the first supporting portion whose top end has a horseshoe slot and the second supporting portions whose top end has two fixing slots are disposed at the two ends of the body portion's top face respectively. The U-shaped fluorescent tube includes a curved tube portion, two straight-tube luminous portions and two electrode portions, wherein each of the two straight luminous sections has one end connected to one or the other end of the curved tube portion. The two electrode portions are correspondingly disposed at the other end of the two straight-tube luminous portions which are of equal length, parallel to each other and situated at the same side of the curved tube portion. The two first heat-dissipating structures, which respectively envelop the two ends of the curved tube portion, are thermal-conductively connected to the curved tube portion and are correspondingly fastened to a horseshoe slot such that the curved tube portion can be positioned therein. The two second heat-dissipating structures, which respectively envelop the two electrode portions and are thermal-conductively connected to the two electrode portions, are correspondingly fastened to two fixing slots, such that the two electrode portions can be correspondingly located therein with the two straight-tube luminous portions situated above the body portion's top face.

Other objects, features, and advantages of the invention will become apparent from the following detailed description of the preferred but non-limiting embodiments. The following description is made with reference to the accompanying drawings.

DETAILED DESCRIPTION OF THE INVENTION

EXAMPLE ONE

Figure 1A:
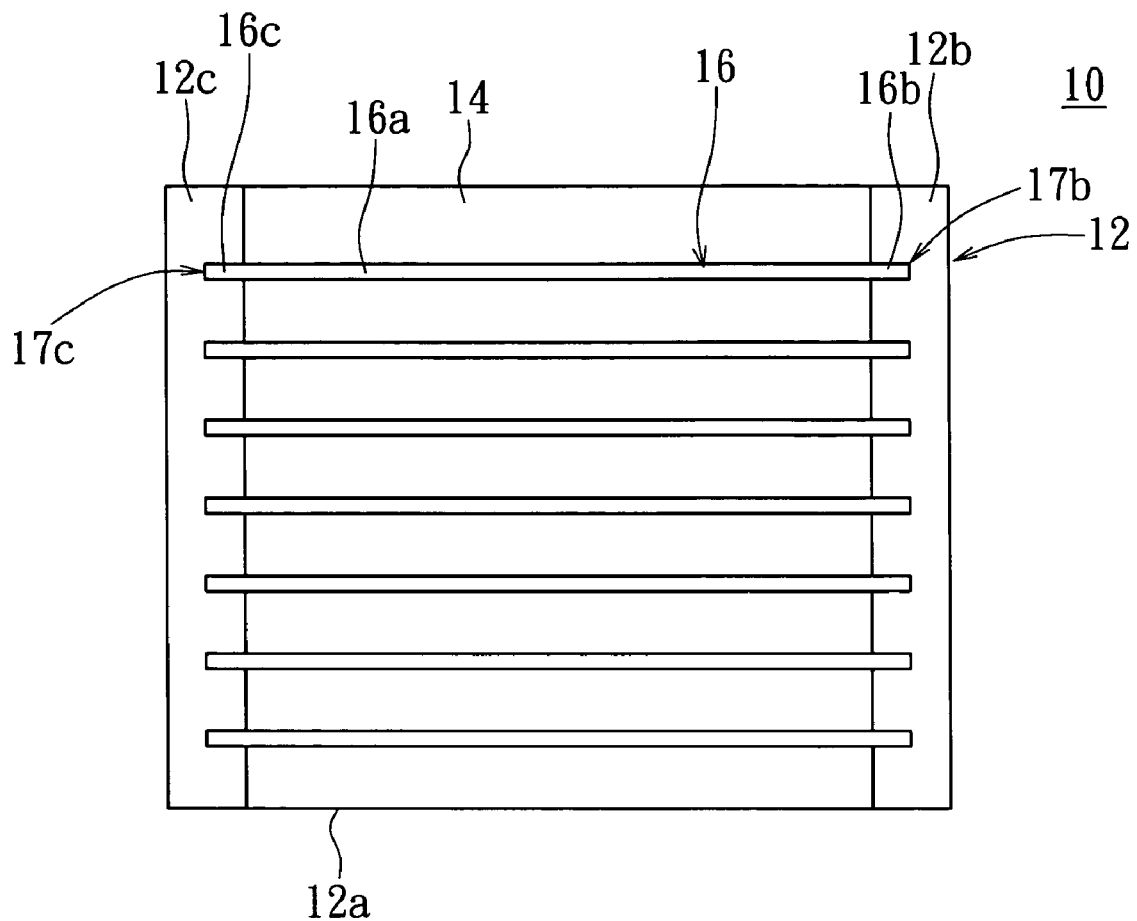
FIG. 1A is a partial top view of a conventional backlight module.
Figure 1B:
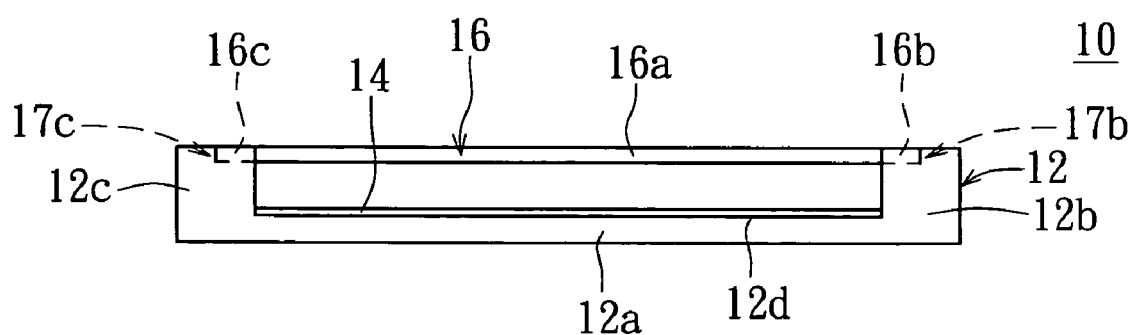
FIG. 1B is a front view of the backlight module illustrated in FIG. 1A.
Figure 2A:
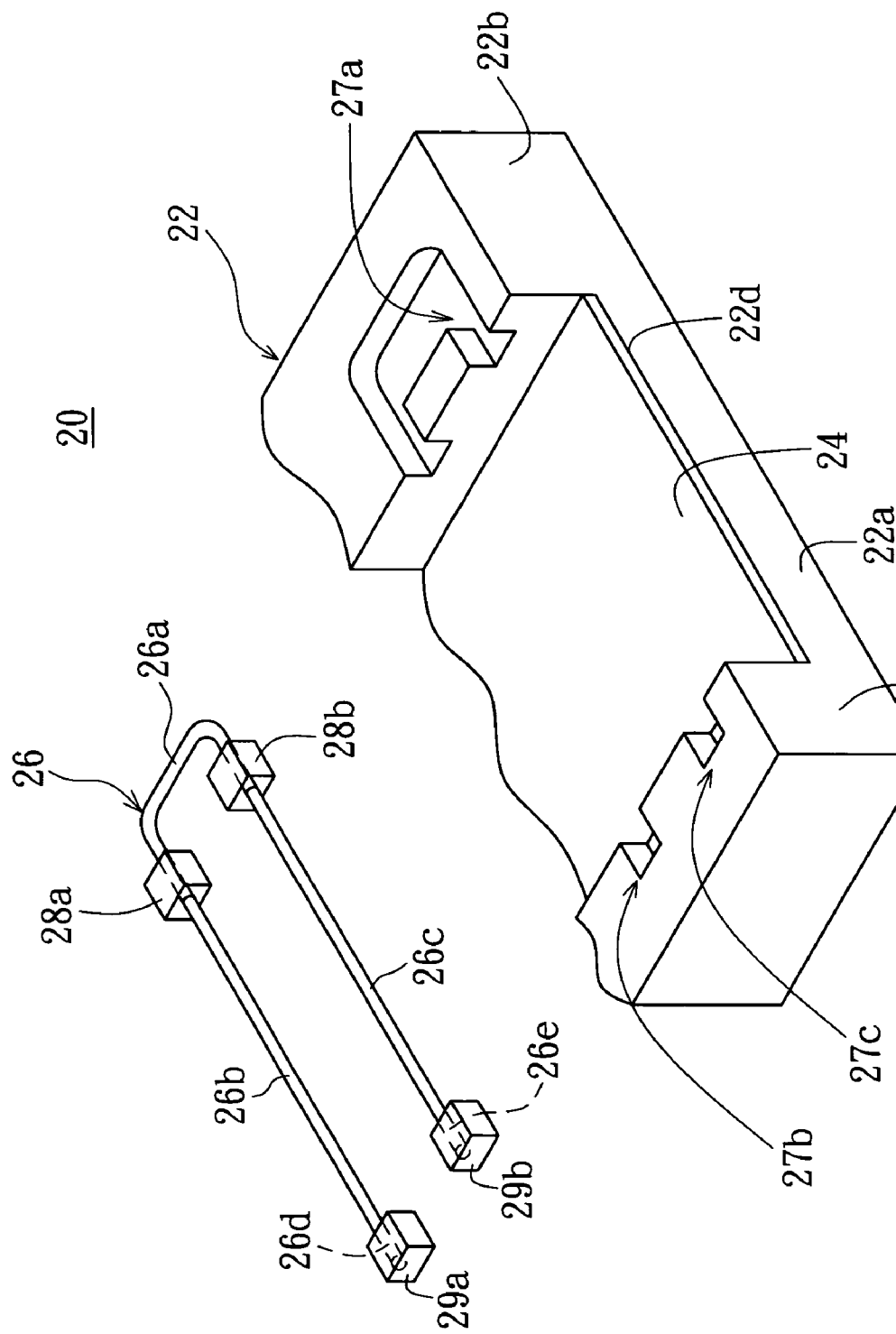
FIG. 2A is a partial three-dimensional decomposition of a backlight module according to preferred embodiment one of the invention.
Figure 2B:
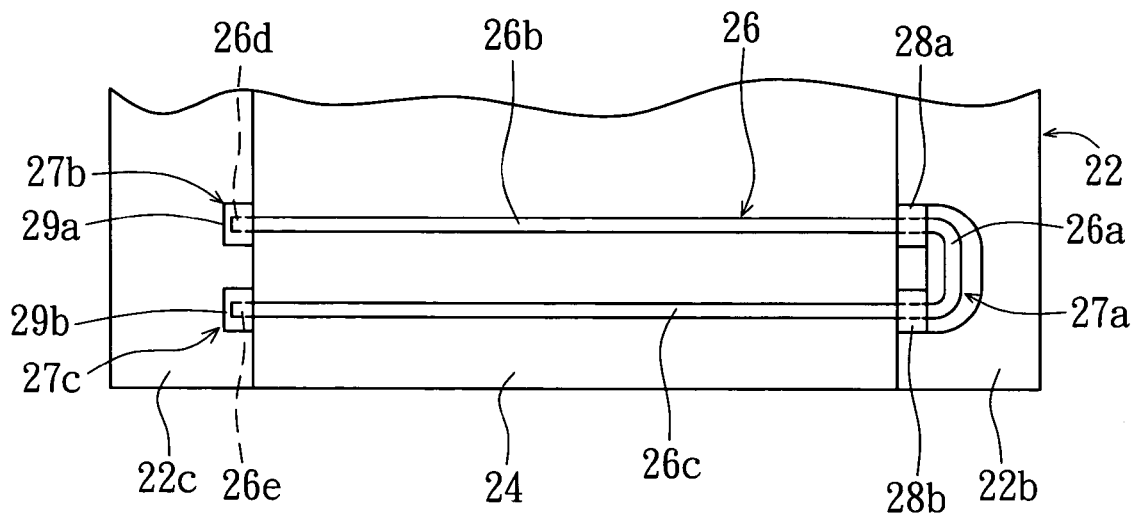
FIG. 2B is a top view of a partial combination of a backlight module according to preferred embodiment one of the invention.

Referring to both FIG. 2A, a partial three-dimensional decomposition of a backlight module according to preferred embodiment one of the invention, and FIG. 2B, a top view of a partial combination of a backlight module according to preferred embodiment one of the invention. In FIG. 2A and FIG. 2B, backlight module 20 includes at least a bezel 22, a U-shaped fluorescent tube 26, a reflector sheet 24, two first heat-dissipating structures 28a and 28b, and two second heat-dissipating structures 29a and 29b. Bezel 22 includes a body portion 22a, a first supporting portion 22b and a second supporting portion 22c, wherein body portion 22a has a body portion's top face. 22d while first supporting 22b whose top end has a horseshoe slot 27a and second supporting portion 22c whose top end has two fixing slots 27b and 27c are respectively disposed at the two ends of body portion's top face 22d.

U-shaped fluorescent tube 26 includes a curved tube portion 26a, straight-tube luminous portions 26b and 26c, and electrode portions 26d and 26e, wherein straight luminous sections 26b and 26c, which are of equal length, parallel to each other and situated at the same side of the curved tube portion 26a, are connected to one or the other end of curved tube portion 26a, while electrode portions 26d and 26e are respectively disposed at the other end of straight-tube luminous portions 26b and 26c.

First heat-dissipating structures 28a and 28b, which envelop the entire or partial of curved tube portion 26a, are thermal-conductively connected to curved tube portion 26a and are respectively fastened to the two openings at horsehoe slot 27a. In the present preferred embodiment, first heat-dissipating structures 28a and 28b respectively envelop the two ends of curved tube portion 26a. Second heat-dissipating structures 29a and 29b, which respectively envelop electrode portions 26d and 26e, are thermal-conductively connected to electrode portions 26d and 26e and are respectively fastened to fixing slots 27b and 27c. When first heat-dissipating structures 28a and 28b are respectively fastened to the two openings at horsehoe slot 27a and when second heat-dissipating structures 29a and 29b are respectively fastened to fixing slots 27b and 27c, U-shaped fluorescent tube 26 can be disposed on bezel 22 as shown in FIG. 2B. Meanwhile, curved tube portion 26a is disposed at horsehoe slot 27a; electrode portions 26d and 26e are respectively disposed at fixing slots 27b and 27c; straight-tube luminous portions 26b and 26c are disposed on reflector sheet 24.

It is noteworthy that the design of first heat-dissipating structures 28a and 28b can reduce the temperatures at the tube wall of curved tube portion 26a to be lower than that at straight-tube luminous portions 26b and 26c, so that mercury can concentrate at curved tube portion 26a. By doing so, the invention not only effectively reduces the deposition of mercury at electrode portions 26d and 26e due to sputter effect, but also prolongs the lifetime of U-shaped fluorescent tube 26. Moreover, the design of second heat-dissipating structures 291 and 29b radiates the heat generated inside electrodes sections 26d and 26e to be outside U-shaped fluorescent tube 26.

Anyone who is familiar with the technology of the invention should realize that the technology of the invention is not limited to the above disclosures. For example, the materials for first heat-dissipating structures 28a and 28b and second heat-dissipating structure 29a and 29b can be metals, high heat-dissipating plastics, high heat-dissipating rubbers, high reflecting materials or transparent materials, while U-shaped fluorescent tube 26 can be a cold cathode fluorescent lamp (CCFL). Besides, if the structure of first heat-dissipating structures 28a and 28b is one-piece casting, the shape of the slot situated at the top of first supporting portion 22b will be adjusted accordingly; if the structure of second heat-dissipating structures 29a and 29b is one-piece casting, the shape of the two fixing slots situated at the top of second supporting portion 22c will be adjusted accordingly. Furthermore, other reflecting materials can be disposed onto the inner surface of first supporting portions 22b and 22c which are connected to body portion's top face 22d.

EXAMPLE TWO

Figure 3A:
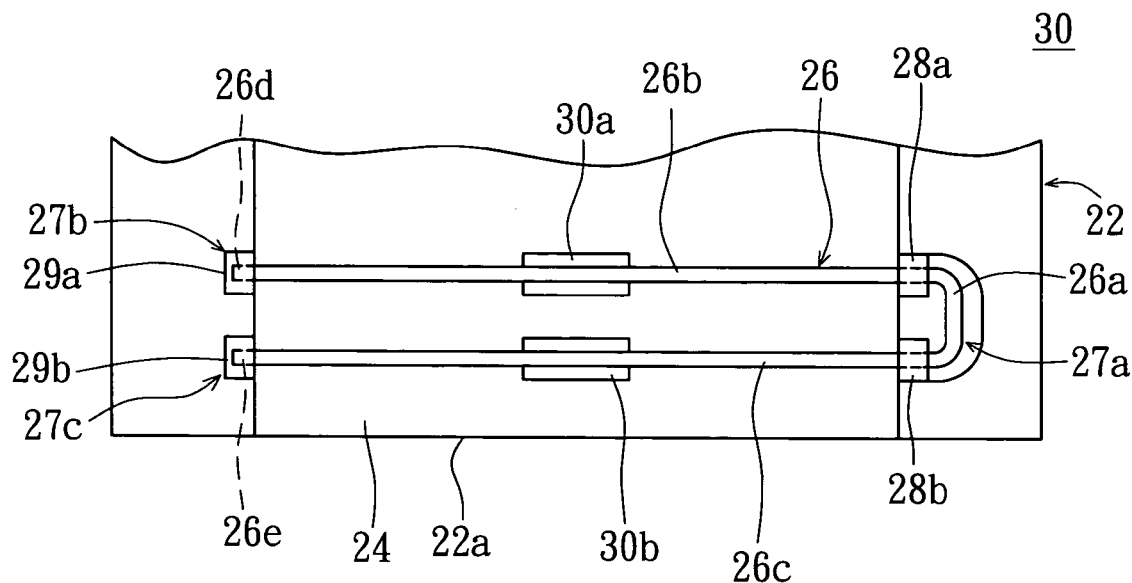
FIG. 3A is a top view of a partial combination of a backlight module according to preferred embodiment two of the invention.
Figure 3B:
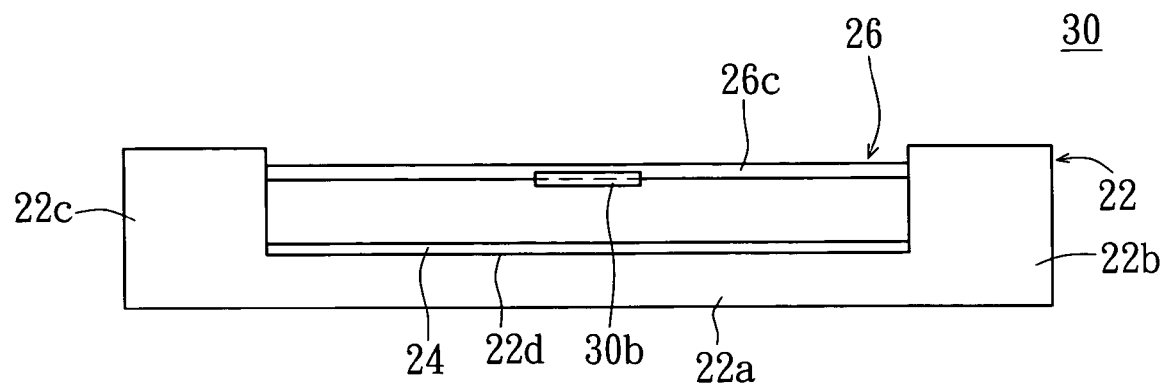
FIG. 3B is a front view of a partial combination of a backlight module according to preferred embodiment two of the invention.
Figure 3C:
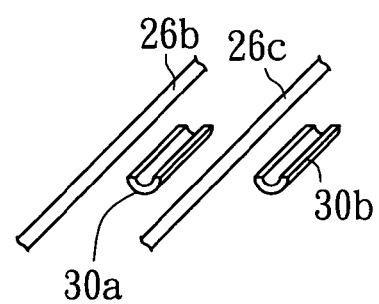
FIG. 3C is a partial three-dimensional decomposition of the straight-tube luminous portion and the third radiating mechanism illustrated in FIG. 3A.

Referring to FIG. 3A, a top view of a partial combination of a backlight module according to preferred embodiment two of the invention, and FIG. 3B, a front view of the backlight module illustrated in FIG. 3A. In FIG. 3A and FIG. 3B, the difference between backlight module 30 disclosed in preferred embodiment two and backlight module 20 disclosed in preferred embodiment one lies in that backlight module 30 further includes third heat-dissipating structures 30a and 30b which respectively envelop the lower half of the central tube of straight-tube luminous portions 26b and 26c and are thermal-conductively connected to straight-tube luminous portions 26b and 26c as shown in FIG. 3C. Other elements of backlight module 30 are the same with that of backlight module 20 and are not to be repeated here.

It is noteworthy that third heat-dissipating structures 30a and 30b are designed to be able to respectively control the temperatures at the tube wall of straight-tube luminous portions 26b and 26c to be between 60~70° C., during which range mercury enables straight-tube luminous portions 26b and 26c to achieve a better luminance.

Anyone who is familiar with the technology of the invention should realize that the technology of the invention is not limited to the above disclosures. For example, the materials for third heat-dissipating structures 30a and 30b whose structure can be one-piece casting can be metals, high heat-dissipating plastics, high heat-dissipating rubbers, high reflecting materials or transparent materials.

EXAMPLE THREE

Figure 4A:
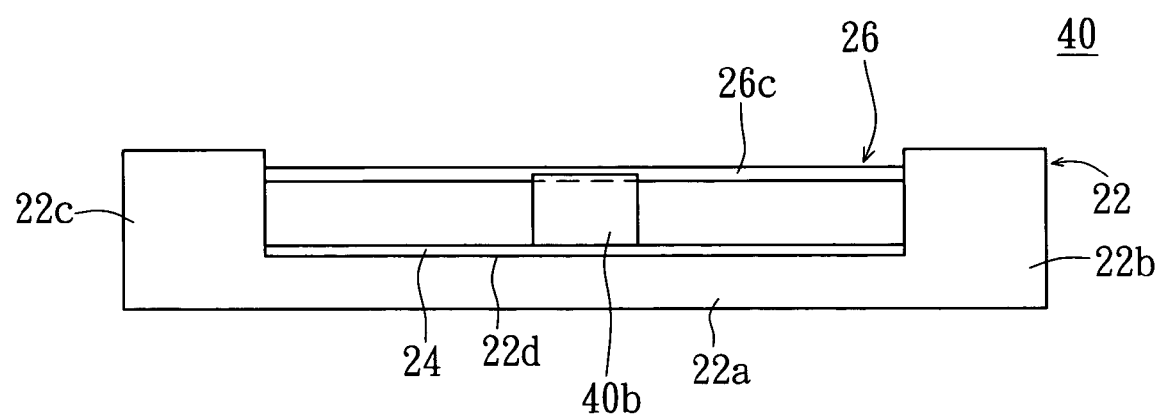
FIG. 4A is a front view of a partial combination of a backlight module according to preferred embodiment three of the invention.
Figure 4B:
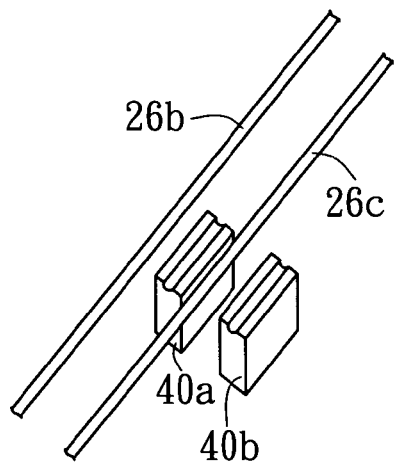
FIG. 4B is a partial three-dimensional decomposition of the straight-tube luminous portion and the fourth heat-dissipating structure illustrated in FIG. 4A.

Referring to FIG. 4A, a front view of a partial combination of a backlight module according to preferred embodiment three of the invention, and FIG. 4B, a partial three-dimensional decomposition of the straight-tube luminous portion and the fourth heat-dissipating structure illustrated in FIG. 4A. In FIG. 4A and FIG. 4B, the difference between backlight module 40 disclosed in preferred embodiment three and backlight module 20 disclosed in preferred embodiment one lies in that backlight module 40 further includes fourth heat-dissipating structures 40a and 40b which are disposed on reflector sheet 24 for respectively supporting the lower half of the central tube of straight-tube luminous portions 26b and 26c and are thermal-conductively connected to straight-tube luminous portions 26b and 26c. Other elements of backlight module 40 are the same with that of backlight module 20 and are not to be repeated here.

Anyone who is familiar with the technology of the invention should realize that the technology of the invention is not limited to the above disclosures. For example, the materials for fourth heat-dissipating structures 40a and 40b whose structure can be one-piece casting can be metals, high heat-dissipating plastics, high heat-dissipating rubbers, high reflecting materials or transparent materials.

EXAMPLE FOUR

Figure 5:
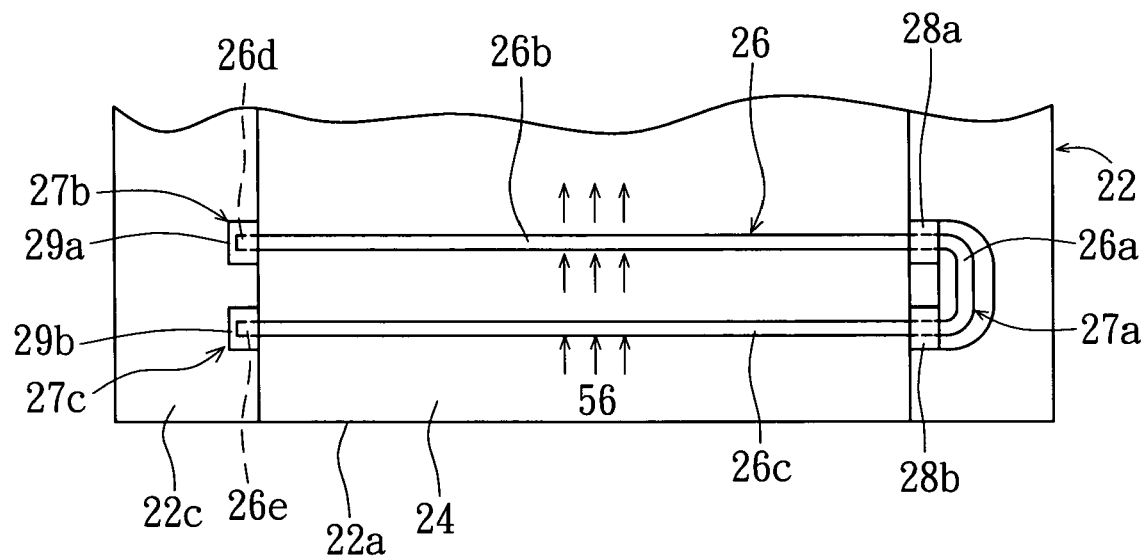
FIG. 5 is a top view of a partial combination of a backlight module according to preferred embodiment four of the invention.

Referring to FIG. 5, a top view of a partial combination of a backlight module according to preferred embodiment four of the invention. In FIG. 5, the difference between backlight module 50 and backlight module 20 illustrated in preferred embodiment one lies in that backlight module 20 adopts a solid cooling method for radiating the heat generated by straight-tube luminous portions 26b and 26c, while backlight module 50 uses a heat-dissipating fluid to cool off the central tube of straight-tube luminous portions 26b and 26c and carries away the heat generated by straight-tube luminous portions 26b and 26c. The temperatures at the tube wall of straight-tube luminous portions 26b and 26c can also be controlled to be between 60~70° C.

The backlight modules disclosed in above preferred embodiments according to the invention whose heat-radiating design of either installing a heat-dissipating structure in the fluorescent tube or using a heat-dissipating fluid to cool off the fluorescent tube can mercury to be concentrated at the curved tube portion, so as to effectively reduce the deposit of mercury at two electrode portions due to sputter effect and further prolong the lifetime of the fluorescent tube. Furthermore, the temperatures at the tube wall of straight-tube luminous portions 26b and 26c can be controlled to be between 60~70° C., during which range the mercury enables straight-tube luminous portions 26b and 26c to achieve a better luminance, hence improving the luminance quality of the backlight module significantly.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight module at least comprising:
   a U-shaped fluorescent tube comprising:
      a curved tube portion;
      two straight-tube luminous portions of equal length, parallel to each other and situated at the same side of the curved tube portion, wherein each of the straight-tube luminous portions has one end connected to one or the other end of the curved tube portion; and
      two electrode portions correspondingly disposed at the other end of the two straight-tube luminous portions;
   a first heat-dissipating structure which envelops the entire or partial of curved tube portion and is thermal-conductively connected to the curved tube portion;
   a second heat-dissipating structure which envelops one of the two electrode portions and is thermal-conductively connected to the enveloped electrode portion; and
   a third heat-dissipating structure which envelops the lower half of the central tube of one of the two straight-tube luminous portions and is thermal-conductively connected to the enveloped straight-tube luminous portion.

2. The backlight module according to claim 1, wherein the materials for the first heat-dissipating structure, the second heat-dissipating structure and the third heat-dissipating structure are metals.

3. The backlight module according to claim 1, wherein the materials for the first heat-dissipating structure, the second heat-dissipating structure and the third heat-dissipating structure are high heat-dissipating plastics.

4. The backlight module according to claim 1, wherein the materials for the first heat-dissipating structure, the second heat-dissipating structure and the third heat-dissipating structure are high heat-dissipating rubbers.

5. The backlight module according to claim 1, wherein the materials for the first heat-dissipating structure, the second heat-dissipating structure and the third heat-dissipating structure are high reflecting materials.

6. The backlight module according to claim 1, wherein the materials for the first heat-dissipating structure, the second heat-dissipating structure and the third heat-dissipating structure are transparent materials.

7. The backlight module according to claim 1, wherein the backlight module further comprises:
   a heat-dissipating fluid for cooling off the central tube of one of the two straight-tube luminous portion and carrying away the heat generated thereby.

8. A backlight module at least comprising:
   a bezel comprising:
      a body portion; and
      a first supporting portion and a second supporting portion, wherein the first supporting portion whose top end has a horseshoe slot and the second supporting portion whose top end has two fixing slots are disposed at the two ends of the body portion's top face respectively;

a U-shaped fluorescent tube comprising:
  a curved tube portion;
  two straight-tube luminous portions of equal length, parallel to each other and situated at the same side of the curved tube portion, wherein each of the two straight luminous sections has one end connected to one or the other end of the curved tube portion; and
  two electrode portions correspondingly disposed at the other end of the two straight-tube luminous portions;

two first heat-dissipating structures, which respectively envelops the two ends of the curved tube portion and are thermal-conductively connected to the curved tube portion, wherein the two first heat-dissipating structures are correspondingly fastened to the horseshoe slot such that the curved tube portion can be positioned therein; and two second heat-dissipating structures, which respectively envelops the two electrode portions and are thermal-conductively connected to the two electrode portions, wherein the two second heat-dissipating structures are correspondingly fastened to the two fixing slots, such that the two electrode portions can be correspondingly positioned therein with the two straight-tube luminous portions situated above the body portion's top face.

9. The backlight module according to claim 8, wherein the backlight module further comprises:
  two third heat-dissipating structures which correspondingly envelops the lower half of the central tube of the two straight-tube luminous portions and are thermal-conductively connected to the two straight-tube luminous portion.

10. The backlight module according to claim 9, wherein the materials for the two first heat-dissipating structure, the two second heat-dissipating structure and the two third heat-dissipating structure are metals.

11. The backlight module according to claim 9, wherein the materials for the two first heat-dissipating structure, the two second heat-dissipating structure and the two third heat-dissipating structure are high heat-dissipating plastics.

12. The backlight module according to claim 9, wherein the materials for the two first heat-dissipating structure, the two second heat-dissipating structure and the two third heat-dissipating structure are high heat-dissipating rubbers.

13. The backlight module according to claim 9, wherein the materials for the two third heat-dissipating structure are high reflecting materials.

14. The backlight module according to claim 9, wherein the materials for the third heat-dissipating structure are transparent materials.

15. The backlight module according to claim 8, wherein the backlight module further comprises:
  a reflector sheet which is disposed on body portion's top face but is located between the first and the second supporting portions; and
  two fourth heat-dissipating structures which are disposed on the reflector sheet for supporting the lower half of the central tube of the two straight-tube luminous portions and are thermal-conductively to the two straight-tube luminous portions.

16. The backlight module according to claim 15, wherein the materials for the two fourth heat-dissipating structures are metals.

17. The backlight module according to claim 15, wherein the materials for the two fourth heat-dissipating structures are high heat-dissipating plastics.

18. The backlight module according to claim 15, wherein the materials for the two fourth heat-dissipating structures are high heat-dissipating rubbers.

19. The backlight module according to claim 15, wherein the materials for the two fourth heat-dissipating structures are high reflecting materials.

20. The backlight module according to claim 8, wherein the backlight module further comprises:
  a heat-dissipating fluid for cooling off the central tube of one of the two straight-tube luminous portion and carrying away the heat generated thereby.

* * * * *